Patented May 30, 1950

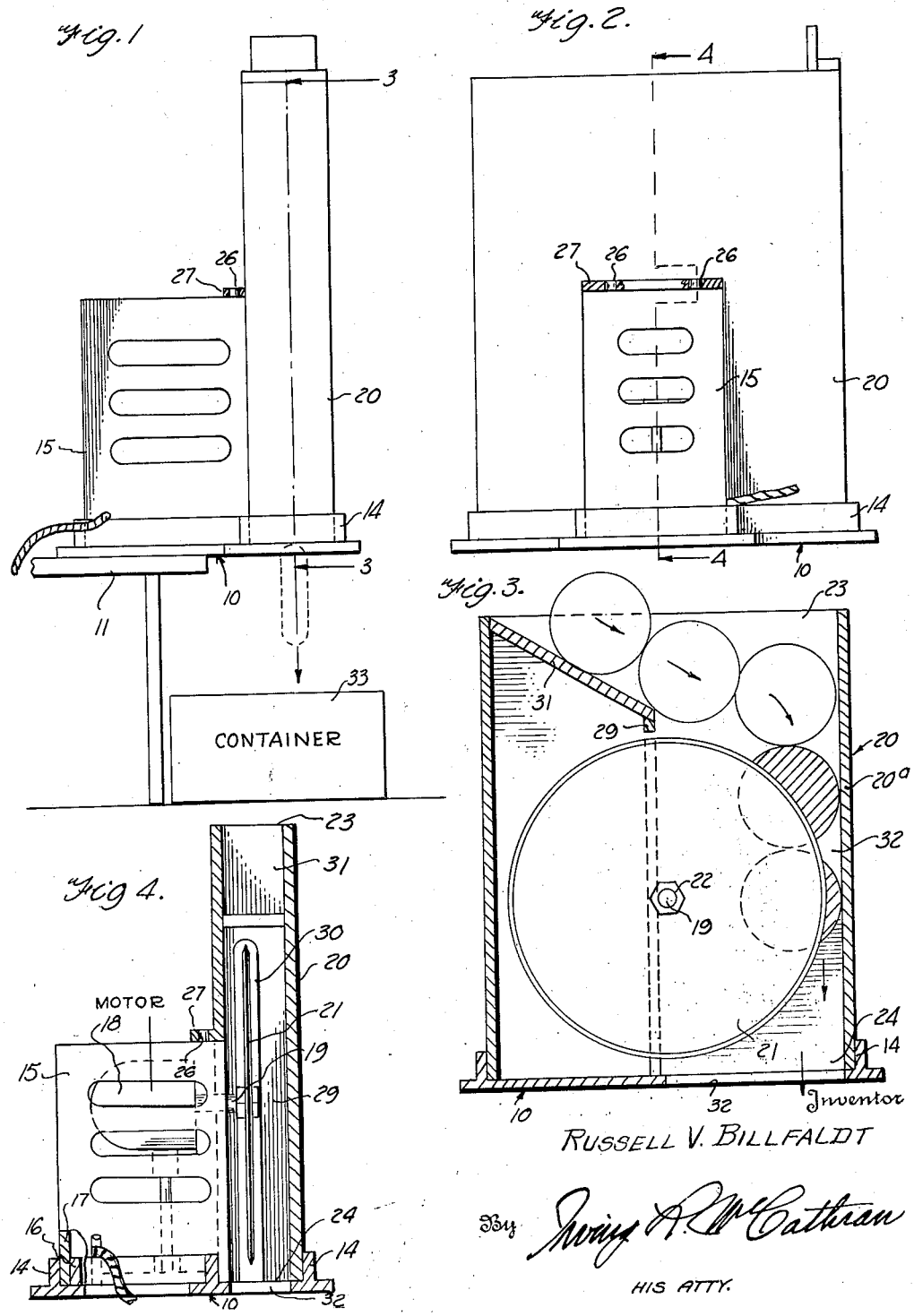

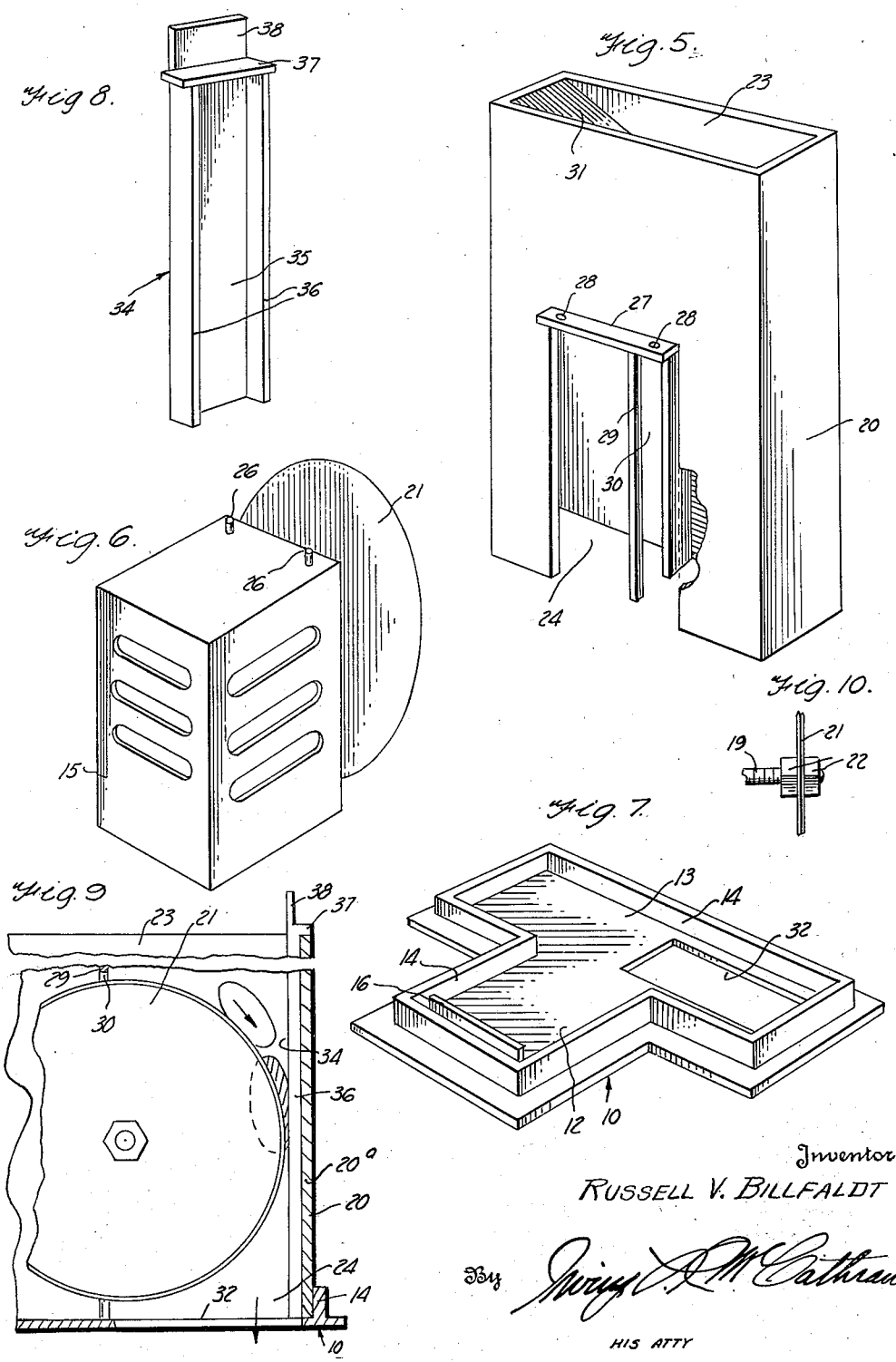

2,509,799

UNITED STATES PATENT OFFICE 2,509,799

ROLL, BISCUIT, AND BUN SLICING MACHINE

Russell V. Billfaldt, Houston, Tex.

Application August 13, 1948, Serial No. 44,104

2 Claims. (Cl. 146—73)

This invention relates to a roll, biscuit and bun slicing machine and has for one of its objects the production of a simple and efficient machine for efficiently slicing biscuits, buns, rolls and similar small breads, in a manner to eliminate hand slicing.

A further object of this invention is the production of a simple and efficient slicing machine which is so constructed as to facilitate the selective slicing of a biscuit, bun or roll, either partly through or completely through.

Another object of this invention is the production of a simple and efficient slicing machine wherein the sections thereof are removably mounted upon a supporting base in a manner whereby the sections may be readily separated for the purpose of cleaning.

Other objects and advantages of this invention will appear throughout the following specification and claims.

In the drawings:

Figure 1 is an edge elevational view of the slicing machine;

Figure 2 is a side elevational view thereof;

Figure 3 is a vertical sectional view taken on line 3—3 of Figure 1;

Figure 4 is a vertical sectional view taken on line 4—4 of Figure 2;

Figure 5 is a perspective view of the main casing of the machine separated from the base and motor casing, a certain portion of the side wall being broken away;

Figure 6 is a perspective view of the motor casing and cutting knife;

Figure 7 is a perspective view of the base;

Figure 8 is a perspective view of the removable bun abutment slide;

Figure 9 is a fragmentary vertical sectional view of the machine showing the bun abutment slide in an operative position; and Figure 10 is a fragmentary side elevational view of the cutting knife and supporting motor shaft, showing the manner of locking the knife upon the shaft.

By referring to the drawing, it will be seen that 10 designates a base which is adapted to rest upon a table or other support 11 in a manner to overhang the support, as shown in Figure 1. The base 10 is substantially T-shaped having a central motor casing supporting portion 12 and an elongated right angularly extending main casing supporting portion 13. The portions 12 and 13 are provided with inset upstanding retaining flanges or ribs 14, as shown in detail in Figure 7. A motor containing casing 15 is supported upon the portion 12 and a retaining strip 16 engages the inner face of the wall 17 of the motor casing 15 to anchor the same against the adjoining flange or rib 14, as shown in Figure 4. An electric motor 18 of a suitable type is supported in any desired manner within the casing 15 and carries a projecting driving shaft 19 which extends into the main casing 20, when the machine is assembled. A knife disc 21 is adjustably locked upon the outer end of the shaft 19 by means of the nuts 22 which fit upon opposite sides of the knife disc 21, as shown in Figure 10. The knife disc may be adjusted to the desired position upon the shaft 19 by adjusting these nuts 22, as will be obvious, to properly fit within the main casing 20.

The main casing 20 removably fits upon the base 10 and the lower end thereof rests upon the elongated portion 12. The flanges 14 assist in retaining the main casing in a detachable anchored position upon the base 10. This main casing 20 preferably comprises an upright body which is rectangular in cross-section having an open top 23 and an open bottom 24. The casing 20 also is provided with a side opening 25 upon one side thereof which terminates short of the top thereof to snugly receive the adjoining side of the motor casing 15 which is of a desired contour to snugly fit into the opening 25. Vertical anchoring pins 26 are carried by the motor casing 15 at the top thereof adjacent the side which fits into the opening 25 of the main casing 20 and this main casing 20 is provided with an overhanging anchoring flange 27 at the top of the opening 25. The flange 27 is provided with spaced apertures 28 for receiving the pins 26 to hold the main casing 20 and the motor casing 15 in locked assembled position.

When assembling the sections of the machine, the base 10 is placed upon a support and secured in position in any suitable manner. The motor casing 15 is placed upon the portion 12 of the base, and the main casing 20 is dropped down over the knife 21 so that the apertures 28 of the flange will fit over the pins 26 and thereby anchor the casings 15 and 20 in assembled relation, the flanges 14 holding the casings in a fixed position upon the base 10.

It will be noted by considering Figures 3, 4 and 5, that the casing 20 carries a vertical partition 29 which is slightly offset from the center toward one side edge of the casing 20 to avoid obstruction of the shaft 19; note Figure 3. This partition 29 is provided with a vertical aperture or slot 30 for receiving the knife disc 21. An inwardly extending and downwardly inclined panel 31 extends from the upper side edge of the main casing to the upper end of the partition 29, which partition is inset at its upper end relative to the upper entrance end 23 of the casing 20. This panel constitutes a chute to deliver the buns, rolls, etc., to the cutting compartment 32 into which the cutting knife 21 extends, as shown in Figure 3. When it is desired to cut the bread products, such as buns, rolls, or biscuits, only partly through in hinge style, the bread products are rolled down the chute or inclined panel 31 in the direction of the arrows shown in Figure 3, and as the knife disc 21 revolves, the bread products will be forced against the edge panel 20ᵃ while the knife disc 21 cuts them to the desired depth. The bread products will then drop down through the open bottom 24 and through the apertures 32 in the base 10 where they will fall into a suitable container 33, as shown in Figure 1.

Where it is desired to cut the bread products, such as buns, rolls or biscuits entirely through to provide two separate halves, a removable abutment slide 34 is extended vertically between the inner face of the abutment wall 20ᵃ and the edge of the knife disc 21, as shown in Figure 9. This slide 34 preferably comprises an abutment panel 35 and a pair of longitudinal side ribs 36. A transverse ledge strip 37 is carried near the upper end of the slide 34 to overhang the upper edge of the main casing 20, and act as a support and fulcrum therefor. The slide 34 is provided with a protruding tongue 38 at its upper end to facilitate the placing of the slide 34 in position and in manipulating the same. Should the slide 34 become worn, or fail to fit sufficiently snug to cause the bread products to be completely cut through the slide 34 may be tiled toward the edge of the knife disc 21 by swinging the slide 34 upon the fulcrum flange or ledge strip 37.

From the foregoing description, it will be seen that the bread products may be easily cut in hinge style, or by inserting the slide 34 these articles may be easily cut in half. Furthermore, the motor casing 15 and the main casing 20 may be easily removed from the base 10 for easy cleaning to comply with the sanitary requirements of various health departments. Since the sections are removable, this will facilitate the repair or replacement of parts, and if so desired, the motor case 15 may be removed from engagement with the main casing 20 and a buffer or polisher may replace the knife disc 21, if desired, for the purpose of polishing silverware. A grinder also may replace the knife disc 21 to sharpen knives and the like, without departing from the spirit of the invention. It should be noted that the present device may be used for cutting either the round type of bun, as shown in Figure 3, or the elongated type as shown in Figure 9, or in fact it may be used in cutting any suitable product, without departing from the spirit of the invention.

Certain detail changes in the mechanical structure may be made without departing from the spirit of the invention, so long as such changes fall within the scope of the appended claims.

Having described the invention, what is claimed as new is:

1. A slicing machine comprising a base, a main casing removably supported upon said base, a motor casing removably supported upon said base, said main casing having a side opening for receiving a portion of said motor casing, a flange adjacent said opening and overhanging the motor casing, means for locking said flange to said motor casing to detachably secure said main casing and said motor casing together, an upstanding retaining flange carried by said base and encircling the bases of the motor casing and said main casing to hold the main casing and motor casing against dislodgement, a motor driven knife carried by the motor casing and extending into the main casing, a chute within the main casing for feeding articles to said knife, and said main casing and base having registering discharge openings for discharging cut articles therefrom.

2. A slicing machine comprising a base, a main casing removably supported upon said base, a flange carried by said main casing, a motor casing removably supported upon said base, said flange having spaced apertures, said motor casing having upstanding pins fitting in said apertures to detachably lock said motor casing and main casing together, an upstanding retaining flange carried by said base and encircling the bases of the motor casing and said main casing to hold the main casing and motor casing against dislodgement, a motor driven knife carried by the motor casing and extending into said main casing, a chute within the main casing for feeding articles to said knife, and said main casing and base having registering discharge openings for discharging cut articles therefrom.

RUSSELL V. BILLFALDT.

REFERENCES CITED

The following references are of record in the file of this patent:

UNITED STATES PATENTS

| Number | Name | Date |
|---|---|---|
| 1,123,534 | Holm | Jan. 5, 1915 |
| 1,380,393 | Knapp | June 7, 1921 |
| 1,417,843 | Knapp | May 30, 1922 |
| 1,615,836 | Halpin | Feb. 1, 1927 |
| 1,903,238 | Larson | Mar. 28, 1933 |
| 2,235,546 | Ahrndt | Mar. 18, 1941 |